Nov. 20, 1934.  L. E. SIMPSON  1,981,081
SIFTING APPARATUS
Filed June 22, 1931  2 Sheets-Sheet 1
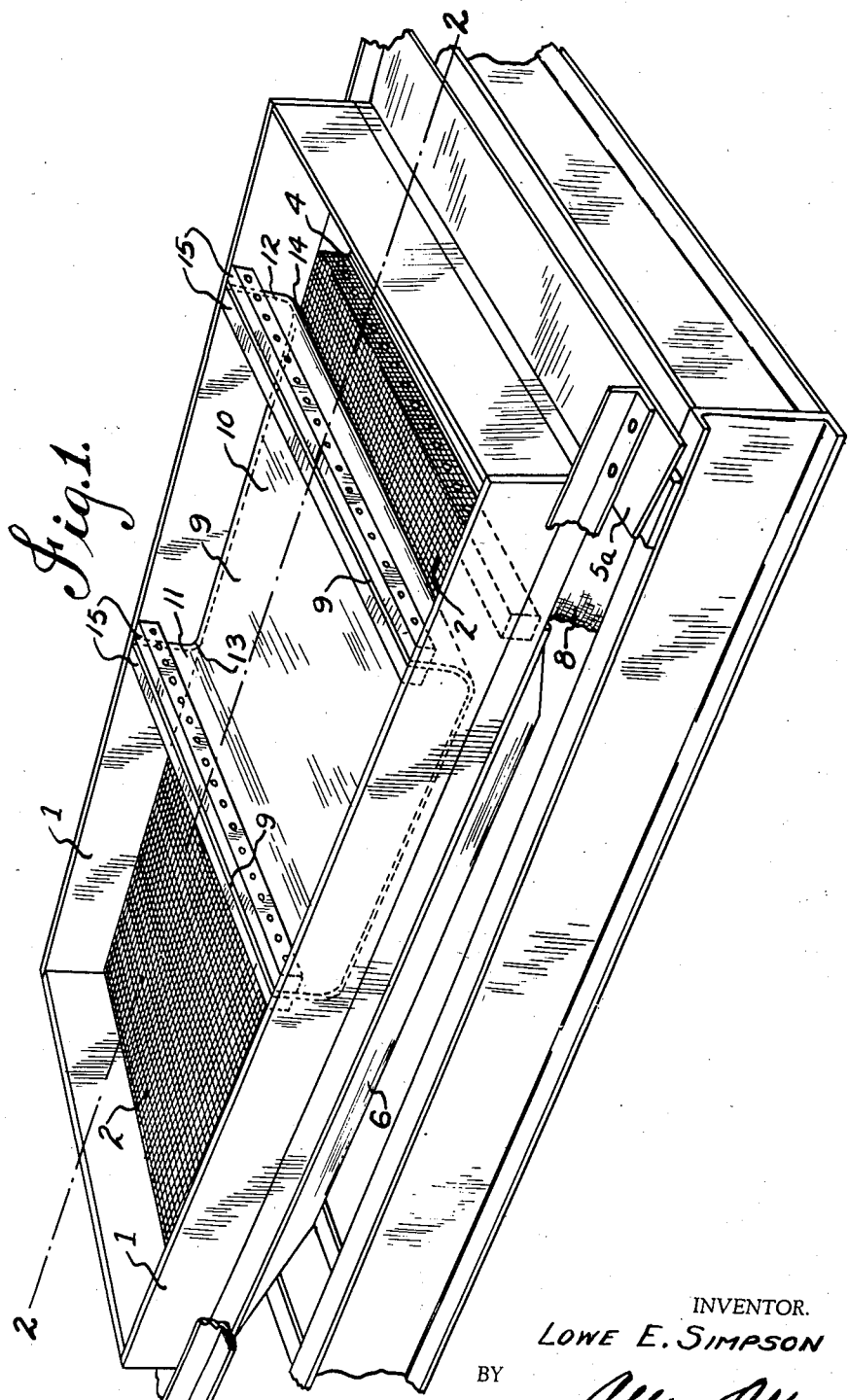
INVENTOR.
LOWE E. SIMPSON
BY
ATTORNEYS.

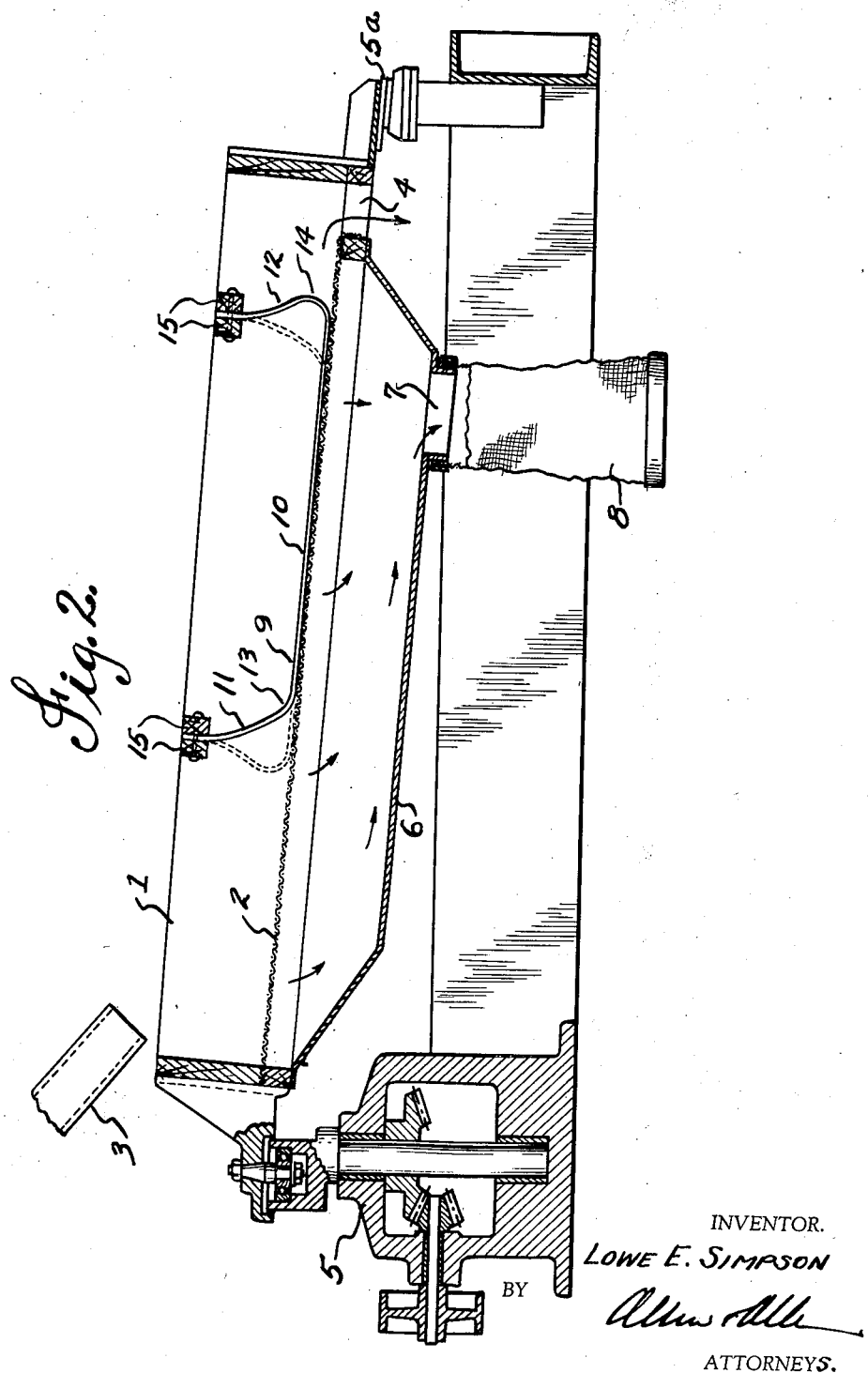

Patented Nov. 20, 1934

1,981,081

UNITED STATES PATENT OFFICE 1,981,081

SIFTING APPARATUS

Lowe E. Simpson, Cincinnati, Ohio

Application June 22, 1931, Serial No. 545,961

4 Claims. (Cl. 209—266)

My invention relates to devices for screening or sifting disintegrated, loose fibrous, granular, powdered or similar material, and more especially to apparatus for such purposes of the type having a substantially flat, pervious or foraminated screen element forming the bottom of a trough or box-like structure which is mounted for suitable movement approximately in the plane of the screen element, and having means for supplying the material to be screened or sifted near one end of the structure, and a suitable outlet at the other end from which are discharged the tailings which have not passed through the screen. An example of such an apparatus is disclosed and claimed in my Patent No. 1,791,291, issued February 3, 1931.

An object of my invention is to insure a passage of a large proportion of the siftable material through the screen, under conditions which will later be described. Other objects will appear in the course of the following description which is illustrated by the accompanying drawings, in which:

Figure 1 is a partial perspective view of a screening or sifting apparatus constructed according to my prior patent above mentioned, illustrating the embodiment of my present invention therein.

Figure 2 is a longitudinal vertical section on the plane of the line 2, 2 of Figure 1, showing parts not shown in Figure 1, viz. the movable mountings for the opposite ends of the screen structure.

In the operation of screens of this character, a considerable amount of the material that comes in from the supply means already is of a fineness to pass through the mesh of the screen, but under the moving or shaking action of the screen the particles of the material cohere and form globular pellets too large to pass through the screen mesh. These pellets thus formed are, of course, of very loose structure, but many of them hold together in such form throughout their passage across the screen to the tailing outlet, to pass out with the tailings. This, of course, is a waste of material of the desired fineness which should pass through the screen along with the other material which does not happen to form into such pellets.

I overcome this difficulty by providing flexible means that slips along and over the screen, with the material coming between this flexible means and the screen and being loosely rubbed by this flexible means against and along the screen, with the result of crushing the pellets above referred to into their original comminuted condition, and also of rubbing this material through the screen mesh.

I consider the best embodiment of this invention to be a blanket of flexible sheet rubber which has its end parts secured to part of the structure of the screen frame, with the middle part of its length which is the major portion of the sheet, lying loosely against the upper surface of the screen, and with the portions which connect this major part with the fastenings extending upward and slack so as to allow this blanket to swing along over the screen with a reciprocating movement imparted by a similar movement of the screen structure, but of different amplitude than the corresponding movement of the screen structure, so that there is a slipping movement of the bottom major portion of the blanket along and over the screen as permitted by the slackness of its upwardly extending connections and the screen structure. Usually the amplitude of blanket movement will be less than the screen movement. Where these end portions extend up from the middle portion, they naturally have curves of considerable radius, which facilitates the entrance of the material coming along the screen under the blanket to be acted upon by virtue of the relative movement of the blanket and screen with the results above mentioned.

A brief description of the example of a sifting or screening apparatus as shown in the drawings will be presented to facilitate the particular description of my improvement. This example, while somewhat simplified for the purpose of clearness, is substantially like that disclosed in my prior patent above mentioned, comprising a trough or box-like structure 1, with the foraminated bottom or screen 2, with one end higher than the other; a suitable spout 3 including down into the higher end to supply the material to be sifted. Next to the lower end the screen 2 terminates at the outlet 4, which allows escape of the tailings or particles which have not passed through the screen 2. The higher or inlet end of the screen structure is suitably mounted on mechanism 5 which imparts to the structure an oscillating motion in a horizontal plane, and the lower end of this structure is mounted on supports 5a, on which it has a peculiar sliding action best understood from my prior patent mentioned. The result of this movable mounting is to oscillate the screen structure in approximately the plane of the screen 2.

Below the screen 2, the structure 1 has a hopper-like bottom 6 inclining downwardly along with the screen structure, and having near its lower end the outlet 7 from which leads a flexible conduit 8; it being understood that the sifted or screened material which has passed through the screen 2 and passes down along the hopper-like bottom 6 due to the motion thereof with the screen structure, escapes through the outlet 7 and the conduit 8, to a suitable receptacle not shown.

The preferred embodiment of my improvement in conjunction with the example shown, comprises the flexible blanket 9, with its major middle portion 10 lying flat upon the screen 2 from one side 1 to the other, and with its end portions 11 and 12 curved upwardly at 13 and 14 respectively, with their upper ends fastened between respective pairs of of cross pieces 15, which extend across between and have their ends fastened to the sides 1 of the screen structure. These upwardly extending portions 11 and 12, in connection with their curved junctions 13 and 14 with the major lower middle part 10, are of such extent that they are slack from this point 10 up to their supports 15. This slackness of the connection of the main lower part 10 of the blanket with its fastenings 15, leaves it free to slip lengthwise along the screen structure from the position indicated by the solid lines, to the position indicated by the dotted lines in Figure 2.

As the material, in lumps, granules, bunches, conglomerates, or the like, too large to pass through the meshes of the screen 2, together with the material in finer form such as to pass through the screen 2, enters upon the screen 2 from the supply spout 3, it is shaken downward along the screen 2, due to the motion of the screen structure and reaches the curved part 13 of the blanket 9, which, moving to and from the oncoming material, passes over the material and then drags the material along the screen; and takes in a new portion of the material at each reciprocation until all along the lower part 10 of the blanket 9 there is material being pressed between the part 10 and the screen 2 yieldingly due to the flexibility of the blanket 9, yet with considerable force, due not only to what rigidity the blanket possesses, but to the weight of the part of the blanket imposed on the material as well. At the other end the material passes out from under the blanket at the curved up portion 14, where it has free passage to the tailing outlet 4.

Any of the fine material that has formed into pellets and which otherwise in the absence of this improvement would roll down along the screen 2 and out through the tailing outlet 4 with the tailings, is thus crushed from its pellet form into loose, comminuted condition, readily passable through the screen 2. Those hard and too large particles which properly form the tailings of course pass out through the tailing outlet 4.

While I have somewhat specifically described the example of the screening or sifting apparatus, as well as the example of my invention embodied therein, I do not wish to be understood as being limited to such precise disclosure, but what I claim as new and desire to secure by Letters Patent, is:—

1. In a sifting apparatus, a screen mounted for alternate movements in the general direction of extent of its effective screening surface, mountings above said surface, spaced in said general direction, means whereby said mountings have alternate movements in said general direction, and a flexible structure with remote portions connected to said mountings to move therewith and with an intermediate sheet portion disposed over said screening surface, the total flexing length of said structure between said mountings being in excess of the distance between said mountings plus the distances of the respective mountings from said screening surface, permitting said intermediate portion to have a free slipping movement along said screening surface incident to the movements of said screen and said mountings, for action on material passing under said intermediate sheet portion substantially as set forth.

2. A sifting apparatus as set forth in claim 1, in which the intermediate sheet portion is of rubber of substantial thickness resisting wrinkling tendencies due to its slipping movement.

3. A sifting apparatus as set forth in claim 1, in which the flexible structure is a continuous sheet from one mounting to the other.

4. A sifting apparatus as set forth in claim 1, in which the flexible structure is a continuous sheet from one mounting to the other, of substantial thickness resisting wrinkling tendencies due to its slipping movement.

LOWE E. SIMPSON.